Feb. 19, 1952     M. A. CHAVANNES     2,585,915
APPARATUS AND METHOD FOR EMBOSSING THERMOPLASTIC FILM
Filed Nov. 30, 1948
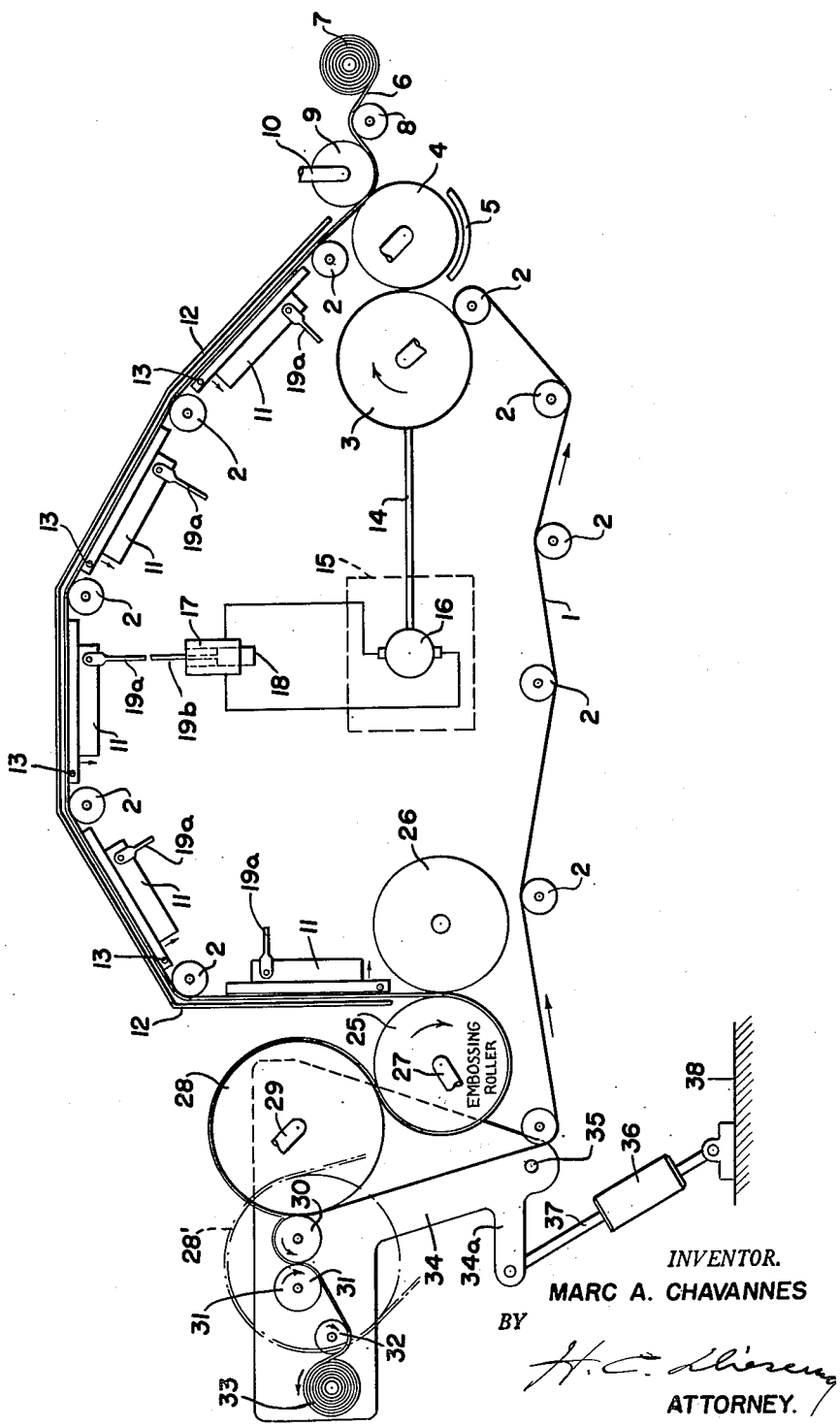
INVENTOR.
MARC A. CHAVANNES
BY
ATTORNEY.

Patented Feb. 19, 1952

2,585,915

UNITED STATES PATENT OFFICE 2,585,915

APPARATUS AND METHOD FOR EMBOSSING THERMOPLASTIC FILM

Marc A. Chavannes, Pompton Lakes, N. J., assignor to Chavannes Industrial Synthetics, Inc., New York, N. Y., a corporation of Delaware Application November 30, 1948, Serial No. 62,703

8 Claims. (Cl. 18—19)

The present invention relates to apparatus and a method for embossing thermoplastic film, particularly thin film.

Thermoplastic film is difficult to emboss because, if cool while being embossed, it has resilient qualtities and consequently will not retain an impression from an embossing roller.

On the other hand, when thermoplastic film is warm, it has little tensile strength, and is easily distorted by any apparatus through which it is passed. The problem of distortion of the film is particularly objectionable with thin films. If the film is so thin that it becomes non-self-supportable when raised to an embossing temperature, the problem becomes very difficult indeed.

Still another difficulty encountered is that when a thermoplastic film is heated, although it will yield to an embossing surface, it has a tendency while warm to smooth itself out and lose the design as soon as the embossing surface is removed.

An object of the present invention is to provide a rapid method and apparatus for producing permanent sharp patterns on thermoplastic film, particularly film which is so thin that it is not self-supportable at an embossing temperature. A feature of one embodiment of the invention is that the thermoplastic film to be embossed is pressed in direct facewise engagement with a hot carrier belt and is caused to adhere to the carrier by the natural adhesive properties of the film. The film is thereafter heated prior to entering the embossing zone, embossed by an embossing roller, passed around the embossing roller and allowed to cool while in contact with the embossing roller, and then stripped from the carrier. The carrier should, for reasons to be explained, have low heat capacity, but should be a good heat conductor. Thus it is preferably a thin belt of metal, as of copper.

In certain previous embossing apparatus, heat and pressure have been applied to thermoplastic sheet-like material while the material passes through an extended embossing zone, and the pressure has been continued while the material passes through a long cooling zone. One difficulty with such apparatus is that the pressure-applying means is necessarily heavy and massive in order to exert sufficient pressure and is consequently of high heat capacity. It may, for example, be of the caterpillar-belt type. Such apparatus must move slowly, in order that, first, the thermoplastic sheet-like material together with the moving embossing members and pressure-applying means may be heated sufficiently to emboss the material, and second, in order that they may be sufficiently cooled that the material retains its embossed design.

A different approach is employed in the present invention. Since the film may, during the process, become heated to such an extent that it is non-self-supportable, it is first bonded, in a novel manner to be described in detail later, to a carrier, which supports and advances the film. It is then heated prior to entering the embossing zone. The principal zone where pressure is applied is a very short one, being, in one embodiment, the nip between a resilient backing or pressure roller and an opposed embossing roller. Since the film has been preheated, however, an embossing impression of satisfactory depth may be made in this short zone. By virtue of the pre-heating, it is possible to eliminate the necessity of exerting great pressure throughout a long, extended embossing zone, and consequently to eliminate heavy, pressure-applying means such as caterpillar belts in the active embossing zone and in the zone where film is cooled in contact with the embossing roller. The surface of the carrier opposite the film may therefore be left exposed in this cooling zone. The film and the carrier may consequently be cooled much more readily than if there were heavy, high-heat-capacity pressure-applying means in engagement with the surface of the carrier opposite the film. As a result, even with high-speed operation, the film and its carrier may be sufficiently cooled as they pass around the embossing roller to cause the embossed design to be permanent and sharp.

Further objects, features and advantages will appear from the more detailed description set forth below by way of illustration, which will now be given in conjunction with the single accompanying drawing which represents film-embossing apparatus illustrating the present invention.

There is provided, in the illustrated embodiment, a metal carrier belt I which is supported by a plurality of guide rollers 2. The belt I is advanced continuously by suitable means. Thus for this purpose one or more of the rollers 2 may be positively driven in synchronism with each other and with other rollers which engage and advance the film. There are advantages in having the belt I made of metal, particularly copper. Stainless steel might also be used.

The belt I serves as a carrier to which the film is temporarily bonded. Prior to the application of the film to it, the carrier is passed over a plurality of large heating rollers 3 and 4. These rollers are heated by steam, supplied through the pipes shown. The rollers 3 and 4 should raise the film to a temperature above its softening point and below its heat-sealing point, say to 180° F., for a film which starts to soften at 150° F. and heat seals at 400° F. If desired, additional heating means such as of the radiant type, schematically illustrated as a heater 5, for elevating the temperature of the carrier, may be provided. Means are provided for positively driving the roller 3, for advancing the carrier.

The thermoplastic film 6, which in the illustrative embodiment may be assumed to be a copolymer of vinyl acetate and vinyl chloride, may be carried by a reel 7, being drawn from this reel over a guide roller 8. It is thereafter pressed by a pressure roller 9 against a surface of the hot belt 1. The roller 9 is, in the illustrated embodiment, cooled to approximately 40°–60° F. by running tap water through it via a pipe 10. The temperature of the roller 9 should at any rate be lower than that of the carrier 1 in order that the film 6 may adhere to carrier and not to the roller 9. It will be understood that while water has been suggested as a cooling fluid for the roller 9, other cooling fluids might be employed.

The carrier belt 1 and the film 6 are thereafter passed over heating means, such as electrical heating units 11 opposed to the exposed surface of the carrier, opposite that to which the film is bonded. Reflectors 12 may be provided opposed to the exposed surface of the film.

It is particularly advantageous to locate the active heaters 11 on only the side of the carrier opposite the side to which the film is bonded. This procedure, combined with the use of a carrier belt which is a good heat conductor, such as one of metal, particularly copper, provides uniform heating of the film.

The heating units 11 may advantageously be adapted to be moved away from or toward the carrier belt. Thus in the illustrated embodiment they are mounted for pivotal movement about an axis toward their left-hand end, at 13. In order that the film may always be heated to approximately the same temperature by the time it reaches the embossing roller, regardless of the speed of movement of the carrier, the position of the heating units 11 is adjusted in relation to the speed of the carrier. That is, the separation of the heating units from the carrier is varied inversely with the speed of the carrier. Thus when the carrier moves slowly, these heating units should be swung somewhat away from the carrier. When the carrier is stopped, they should be swung a considerable distance away from the carrier, in order to avoid overheating of the film.

There is disclosed means for automatically adjusting the position of the heating units 11 in response to variations in the speed of the carrier. Such means are schematically illustrated as a shaft 14, which may be coupled to the means which drives the roller 3, so that the speed of the shaft 14 is proportional to the speed of the movement of the carrier. There is provided means generally indicated by the rectangle 15, driven by the shaft 14, adapted to generate an electric current proportional to or otherwise related to the speed of the shaft. Such means may comprise a D. C. or A. C. generator 16. Current from the generator 16 is supplied to a winding 17 of a solenoid. The solenoid includes a movable armature 18 adapted to be attracted by the winding 17. This armature is mechanically coupled to the heating units 11 by suitable means. In the illustrated embodiment such means are schematically shown as rods 19a pivotally carried by the heating units, and rod 19b carried by the armature. These rods 19a and 19b will be understood to represent schematically a suitable mechanical linkage coupling the armature 18 and the heating units 11 in such a way that as the armature is attracted farther into the winding, the linkage drives the heating units 11 closer to the carrier 1. Suitable means, such as springs, are provided for yieldingly urging the heating units 11 away from the carrier.

When the machine is in operation, the shaft 14 will drive the generator at a speed related to the speed of the carrier. The generator in turn will supply to the winding 17 a current related to this speed, and armature 18, being attracted into the winding 17 against the opposing force of the springs on the heating units 11, will position the heating units close to the carrier when the machine is running rapidly and farther from the carrier when the machine is running slowly or is stopped. The heating units should be adapted to raise the film to an embossing temperature, for example, about 350° F., by the time it contacts the embossing roller.

There is provided an engraved embossing roller 25, adapted to engage the film, and a backing or pressure roller 26 opposed thereto, adapted to engage the carrier. The embossing roller is positively driven in synchronism with the roller 3, which advances the carrier. The backing roller 26 has a surface of leather in the illustrated embodiment in order to provide a firm but slightly yielding surface. The two rollers are pressed toward one another, and the embossing roller impresses a design on the warm, soft film. In order to set the film so that it will retain the design, the embossing roller 25 is cooled, as by running tap water or other cooling fluid through it via a pipe 27. The carrier belt and the film embrace the embossing roller 25 through an angle greater than 180° in the illustrative embodiment, and the film gradually cools as it passes around this roller. In passing around this roller, the film is on the inside, next to the roller. The carrier belt 1 is on the outside and its surface opposite the film is exposed, for ready cooling. The embossed pattern on the roller 25 maintains the design on the film while the film cools and sets at least sufficiently so that it may be removed from this roller and yet will retain its embossed pattern. The fact that the carrier belt is thin and of low heat capacity is of considerable help in accelerating the process of cooling the carrier belt and the film sufficiently rapidly that the process can be carried on at high speed.

The carrier belt and the film next leave the embossing roller 25 and pass around a roller 28, for additional cooling. The roller 28 is preferably cooled by running tap water or other cooling fluid through it via a pipe 29. The film is now on the outside, and the carrier belt is next to the roller 16.

The film 6 is thereafter stripped from the belt 1 with the aid of rollers 30 and 31, passed over a guide roller 32 and wound on a reel 33.

The belt 1 is thereafter returned to its starting point, to be heated again, and then to receive more film.

In order to emboss the film with various patterns, it is desirable to be able to replace the engraved roller 25 with another roller engraved with a different pattern. As may be seen from the drawing, however, the position of the roller 25 with respect to the rollers 28 and 26 and the carrier belt would make it difficult to remove the roller 25 if special provision were not made therefor. For this purpose, the rollers 28, 30, 31, 32, and reel 33 are all mounted on a movable frame member 34. The member 34 is mounted for pivotal movement about an axis at 35. The "released" position of the roller 28, shown in broken lines at 28', and the position of the axis 35 are so chosen that slack is not produced in the carrier 1 when the roller 28 is in its "released" position or in its operating position, provided the roller 25 is in place; and on the other hand, the carrier permits such movement.

For controlling the position of the movable frame member 34 there is provided an hydraulic cylinder 36 with cooperating piston, not shown. The piston drives a piston rod 37 pivotally coupled to an extension 34a of the movable frame 34. The lower end of the cylinder 36 is pivotally mounted on a base 38.

Among the features disclosed in the above-described embodiment, the following may be noted:

The carrier, illustrated as a thin flexible belt of copper, is heated, before application of the thermoplastic film to it, to a sufficiently high temperature that the film will adhere to it by the natural adhesive properties of the film.

The film is applied directly to the advancing carrier, in facewise engagement, with the aid of the roller 9. This roller is cooler than the carrier and cooler than the roller 4.

Additional heat is then applied to the carrier after application of the film to the carrier and before the film contacts the embossing roller. The heat is preferably applied only to the side thereof opposite the film.

The heat is applied at a rate which varies inversely with the speed of the carrier, the heating units being automatically positioned by electro-mechanical means responsive to motion of the carrier.

The film is soft, being at an embossing temperature, at the time it contacts the embossing roller.

At the time the film and carrier enter the nip of the embossing and backing roller, the full thickness of the film may be heated to temperatures so high that the film is non-self-supportable. This is particularly true of thin film.

The active embossing or moulding of the film is accomplished in a very short zone, at the nip between the embossing roller and a leather-coated backing roller.

The embossing roller is cooled.

In passing around the embossing roller, the surface of the carrier opposite the film is exposed, and is free from pressure-applying means, whereby it may readily cool. The carrier itself is not under enough tension to exert an embossing pressure on the film. The real embossing pressure is applied only by the backing roller at the initial point of tangency of the film with the embossing roller. After passing this high-pressure zone, the film, during most of its path around the embossing roller, is in a low-pressure zone.

The film embraces the embossing roller through more than 180°.

The cooling roller 28, and the stripping rollers are carried by a pivotally mounted frame member. The roller 28 may be swung to a "release" position clearing a vertical path for removal of the embossing roller.

A typical satisfactory carrier belt 1 is a copper belt having a thickness of between one and twenty mils.

While a suitable form of apparatus and mode of procedure to be used in accordance with the invention have been described in some detail, and certain modifications have been suggested, it will be understood that numerous changes may be made without departing from the general principles and scope of the invention.

I claim:

1. A method for embossing thermoplastic film, comprising applying said film to a continuously moving carrier belt, heating said film while on said carrier belt to a softening temperature, embossing said film while it is hot and soft and while it is supported by said moving carrier belt between a cool, continuously moving embossing surface and a backing surface by pressing said carrier belt and said film toward said embossing surface along a relatively narrow line extending transversely of said carrier belt in the region where said hot, soft film first contacts said embossing surface, with sufficient pressure to effect said embossing, thereafter holding said film against said cool embossing surface with the aid of said carrier belt throughout an extended zone, and thereafter removing said film from said embossing surface and from said carrier belt.

2. A method for embossing thermoplastic film, comprising supporting and continuously advancing said film on a moving carrier belt of good heat conductivity, heating said film while on said carrier belt to a softening temperature, whereby the good heat conductivity of said belt aids in the uniform distribution of heat across and along said film, thereafter bringing said hot, soft film into contact with a cool continuously-moving embossing surface while said film is supported by said moving carrier belt, pressing said carrier belt and said hot, soft film toward said embossing surface along a relatively narrow line extending transversely of said carrier belt in the region where said hot, soft film first contacts said embossing surface, with sufficient pressure to effect said embossing, thereafter holding said film under a lesser pressure against said cool embossing surface with the aid of said carrier belt throughout an extended zone, said carrier belt being thin enough and said extended zone being long enough to enable said film to cool to a setting temperature at which it will retain the embossed pattern, while still held against said embossing surface, and thereafter removing said film from said embossing surface and from said carrier belt.

3. A method for embossing a preformed thermoplastic film, comprising heating an advancing thin metal carrier belt to a temperature above the softening point of said film, pressing one surface of said film against said hot carrier belt while simultaneously chilling the opposite surface of said film, so as temporarily to bond said film to said carrier belt, heating said film while on said carrier belt to a softening temperature, passing said hot film and said carrier belt around a chilled embossing roller so as to hold said film against said roller through an extended arc, exerting a greater pressure against said carrier opposite the initial line of tangency of said film with said embossing roller than during the remainder of its contact area with said roller, said carrier belt being thin enough to enable said film to cool to a temperature at which it sets and retains the embossing pattern while in contact with said roller, removing said carrier and said film together from said embossing roller, chilling said film further by chilling said carrier, and stripping said film from said carrier.

4. A method for embossing thermoplastic film, comprising applying said film to a continuously advancing carrier belt, heating said film while on said carrier belt to a softening temperature, passing said hot film and said carrier belt around a chilled embossing roller so as to hold said film against said roller through an extended arc, exerting a greater pressure against said carrier opposite the initial line of tangency of said film with said embossing roller than during the remainder of its contact area with said roller, said carrier belt being thin enough to enable said film to cool to a temperature at which it sets and retains the embossed pattern while in contact with said roller, removing said carrier and said film together from said embossing roller, chilling said film further by chilling said carrier, and thereafter stripping said film from said carrier.

5. In apparatus for embossing thermoplastic film, in combination, a continuously advancing metal carrier belt for supporting and advancing said film, said belt having a thickness of between one and 20 mils, whereby it is thin enough so that its temperature may be readily changed, means for applying said film to said belt, means for heating said film to a softening temperature while it is supported by said belt, a chilled embossing roller for embossing said warm, soft film, said carrier belt embracing said embossing roller through an extended arc so as to hold said film against said roller throughout said arc, a backing roller engaging said carrier belt opposite the initial point of tangency of said film with said embossing roller, means for removing said film together with said carrier belt from said chilled embossing roller after they have passed in an arcuate path around same, and means for thereafter stripping said embossed film from said carrier belt.

6. In apparatus for embossing thermoplastic film, in combination, a continuously advancing metal carrier belt for supporting and advancing said film, means for applying said film to said belt, means for heating said film to a softening temperature while it is supported by said belt, means providing a chilled, continuously-advancing, curved embossing surface for embossing said warm, soft film, said carrier belt embracing said curved embossing surface through an extended path so as to hold said film against said surface throughout said extended path, a backing roller engaging said carrier belt opposite the initial line of tangency of said film with said embossing surface for pressing said film against said surface to emboss it, and means for removing said film and said carrier belt from said chilled embossing surface after they have passed in said extended path along the same and for stripping said embossed film from said carrier belt.

7. Apparatus for embossing thermoplastic film, comprising a continuously moving carrier belt for supporting said film, heaters for heating said film to a softening temperature while supported by said carrier belt, means responsive to the speed of said carrier belt for moving said heaters closer to said carrier belt when it moves rapidly and farther from said carrier belt when it moves slowly, a chilled embossing roller for embossing said warm, soft film, said carrier belt embracing said embossing roller through an extended arc so as to hold said film against said roller throughout said arc, a resilient backing roller engaging said carrier belt opposite the initial point of tangency of said film with said embossing roller, means for removing said film together with said carrier belt from said chilled embossing roller after they have passed in an arcuate path around same, and means for thereafter stripping said embossed film from said carrier belt.

8. Apparatus as in claim 7 including means for chilling said film and said carrier belt after they are removed from said embossing roller and before said film is stripped from said carrier belt.

MARC A. CHAVANNES.

REFERENCES CITED

The following references are of record in the file of this patent:

UNITED STATES PATENTS

| Number | Name | Date |
| --- | --- | --- |
| 986,162 | Gare | Mar. 7, 1911 |
| 1,876,432 | Phillips | Sept. 6, 1932 |
| 2,030,066 | Jenett | Feb. 11, 1936 |
| 2,143,627 | Knowland | Jan. 10, 1939 |
| 2,345,629 | Reilly | Apr. 4, 1944 |
| 2,472,551 | Smith | June 7, 1949 |